United States Patent [19]
Gignac et al.

[11] Patent Number: 5,697,194
[45] Date of Patent: Dec. 16, 1997

[54] MODULAR SEAL ASSEMBLY FOR A WALL OPENING

[75] Inventors: Robert J. Gignac, Plymouth; Edward L. Kwiatkowski, Ann Arbor; Carl R. Griffiths, Holt, all of Mich.

[73] Assignee: PSI Telecommunications, Inc., Reno, Nev.

[21] Appl. No.: 666,649

[22] Filed: Jun. 18, 1996

[51] Int. Cl.$^6$ .................................................. F16J 15/10
[52] U.S. Cl. .................... 52/220.8; 138/106; 277/102; 277/104; 277/124; 277/192; 277/198; 277/199; 285/64; 285/346
[58] Field of Search .................. 52/220.8; 285/64, 285/346; 138/103, 106; 277/199, 198, 192, 102, 104, 124, 125, 142, 228, 217

[56] References Cited

U.S. PATENT DOCUMENTS

| | | | |
|---|---|---|---|
| 2,459,370 | 1/1949 | Ferguson et al. | 277/199 X |
| 3,466,693 | 9/1969 | Grant | 277/216 X |
| 3,528,668 | 9/1970 | Barton | 277/199 |
| 3,649,034 | 3/1972 | Barton | 277/104 |
| 3,703,297 | 11/1972 | Gignac | 285/346 X |
| 4,262,168 | 4/1981 | Bossard | 277/217 X |
| 4,607,469 | 8/1986 | Harrison | 52/220.8 |
| 4,717,160 | 1/1988 | Zitting et al. | 277/102 X |
| 4,993,724 | 2/1991 | Hauff | 277/221 X |
| 5,213,341 | 5/1993 | Griffiths | 277/104 |
| 5,290,073 | 3/1994 | Chen | 277/192 X |
| 5,340,123 | 8/1994 | Griffiths | 277/199 X |

Primary Examiner—Wynn E. Wood
Assistant Examiner—Laura A. Saladino
Attorney, Agent, or Firm—Dorn, McEachran, Jambor and Keating

[57] ABSTRACT

A modular seal assembly for sealing a circular opening through a wall, usually with one or more conduits (i.e., telecommunication cables) extending through the seal. The assembly includes an outer pressure annulus and a thick inner pressure disc, both of natural or synthetic rubber, EPDM, urethane, or other elastomer. In the outer annulus the elastomer is an annular series of interconnected blocks of length L1 having a central opening of radius R2; a series of pressure bolts compress the blocks axially, expanding the annulus both outwardly and inwardly. The inner disc, which has an outer radius of about R2 and is interlocked with the elastomer blocks of the outer annulus, has a multiplicity of circular layers, much like an onion; the layers are concentric about an opening through which a conduit usually extends. Tightening the pressure bolts causes the outer annulus to compress the disc, forcing the disc against the conduit to complete a seal; the elastomer blocks of the outer annulus seal against the wall opening.

16 Claims, 7 Drawing Sheets

MODULAR SEAL ASSEMBLY FOR A WALL OPENING

BACKGROUND OF THE INVENTION

In a variety of structures, commercial, residential, or industrial, it is often necessary to extend a pipe, wire, cable, or conduit (water, gas, electrical, telecommunication, etc.) through a wall opening; the wall may be a floor or ceiling. It is usually desirable or even mandatory to provide a seal between the conduit and the wall opening to preclude passage of water or other fluids through the wall and maintain the integrity of the wall.

One practical and effective seal construction for some applications of this kind is described in Barton U.S. Pat. No. 3,528,668. In the Barton seal, a series of elastomer (rubber, synthetic rubber, EPDM, urethane, etc.) blocks, interleaved and interconnected in a ring-like annular array, are mounted in a wall opening. A conduit passes through the central opening of the ring. A plurality of pressure bolts, usually one for each elastomer block, extend paraxially through the ring of elastomer blocks. The bolts are tightened to squeeze the elastomer blocks axially, expanding the blocks radially to afford a seal between the wall opening and the conduit. That seal is most effective when the conduit is of a size comparable to the wall opening. However, the seal of Barton U.S. Pat. No. 3,528,668 is not readily adapted to use with plural conduits extending through one wall opening, as may be required for telecommunication cables, electrical conduits, and the like. Moreover, the seal is not readily adaptable to use in sealing off a wall opening provided for future use.

Another known seal construction, often used for sealing plural cables into one wall opening, uses a rather thick elastomer disc having one or more openings to receive cable or other conduits. The elastomer disc has a plurality of concentric layers, rather like the layers of an onion, around each conduit opening. By removing one or more layers, the disc can be adapted to use with varying conduit sizes. A pressure structure encompassing the disc affords radial compression to complete a seal to the conduit(s); a peripheral seal to a wall opening is more difficult to achieve. For this type of seal assembly, the pressure structure for the elastomer disc is different for each size of wall opening and for each combination of plural conduits, which also may have different sizes; the resulting need for a proliferation of pressure structures is not economically desirable.

SUMMARY OF THE INVENTION

It is an object of the invention to provide a new and improved modular seal assembly that retains the desirable properties of the two prior seal structures described above but effectively eliminates the difficulties and problems of both, particularly for different numbers of conduits in a variety of conduit sizes mounted in and sealed into wall openings of varying size.

Another object of the invention is to provide a new and improved modular seal assembly suitable for sealing a wall opening with no conduit therethrough yet readily adapted, in the field, to sealing one or more conduits into the wall opening.

Accordingly, the invention relates to a modular seal assembly for sealing a wall opening having a boundary wall with a given axial length and a radius R. The modular seal assembly comprises an outer compression/expansion annulus including a plurality of interconnected elastomer blocks, each block having an outer face and an inner face displaced by an axial length L1, and each block having a given radial thickness. The elastomer blocks are interconnected in an outer annulus having a central opening of radius R2 and having an outer annulus dimension smaller than R to allow insertion of the outer annulus into the boundary wall of the annular opening. The modular seal further includes a thick elastomer inner compression/expansion disc, having an outer annular surface radius no larger than R2 to allow disposition of the disc in the central opening of the outer annulus and having an axial length L2 smaller than L1. The disc is disposed within the central opening of the outer annulus. Preferably, interlock means are provided to interlock the inner elastomer disc within the central opening of the outer annulus. There are a plurality of pressure bolts; each bolt is associated with at least one outer elastomer block. Each belt is used to apply pressure to the associated outer elastomer block to compress that outer elastomer block axially and to expand that outer elastomer block radially outwardly against the boundary wall of the opening and radially inwardly against the inner elastomer disc.

DESCRIPTION OF THE PREFERRED EMBODIMENTS

Figure 1:
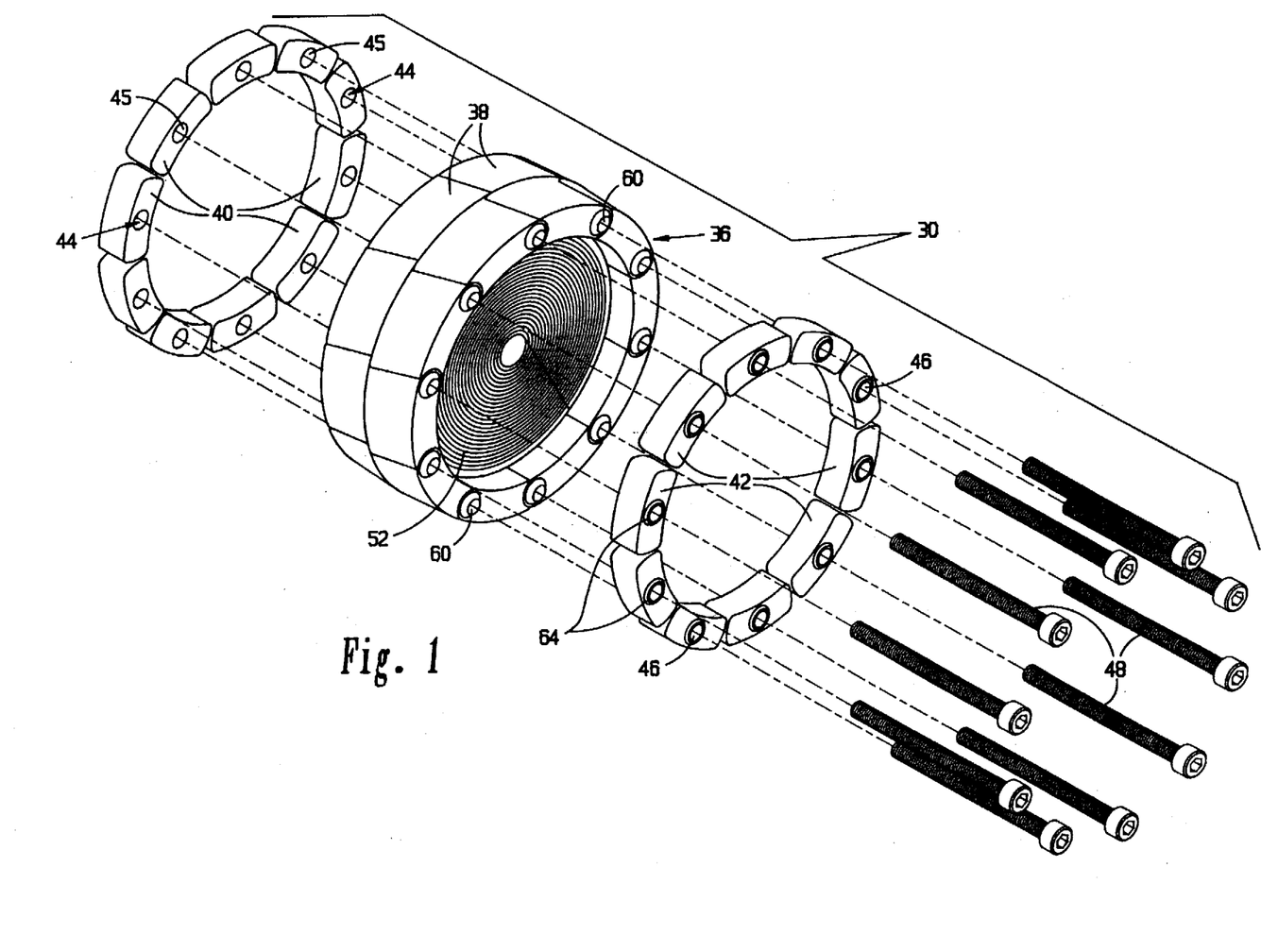
FIG. 1 is an exploded view of a modular seal assembly constructed in accordance with a preferred embodiment of the invention.
Figure 2:
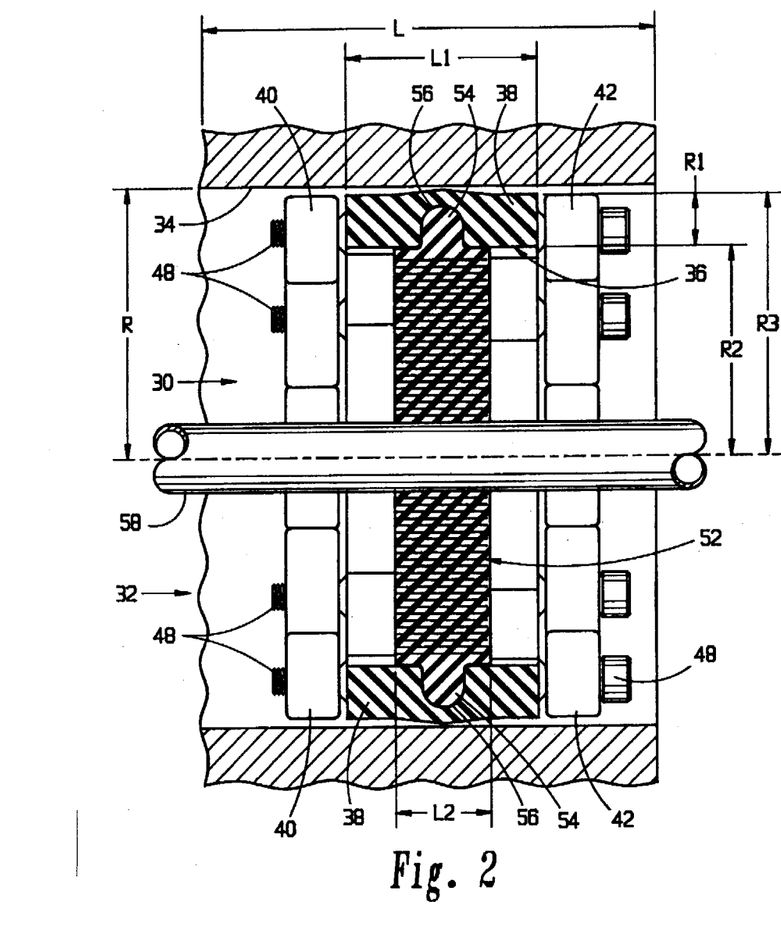
FIG. 2 is a sectional elevation view of the seal assembly of FIG. 1 in position of use prior to tightening of its pressure bolts.
Figure 3:
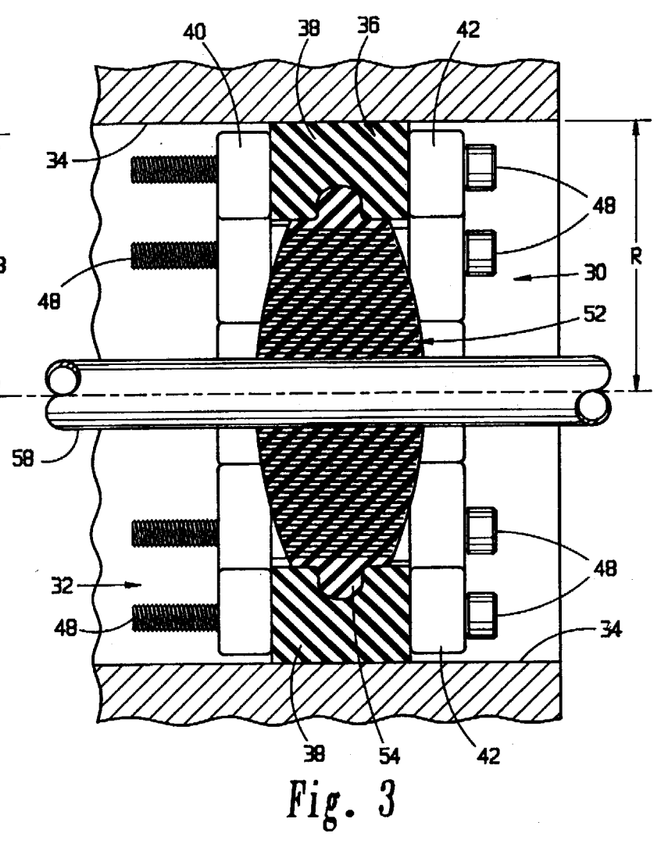
FIG. 3 is a sectional elevation view like FIG. 2 after the pressure bolts have been tightened.

The modular seal assembly 30 illustrated in FIGS. 1–3 (details are shown in FIGS. 4–14) comprises a preferred embodiment of the invention. FIG. 1 shows seal assembly 30 with its principal components separated ("exploded") relative to each other. FIG. 2 illustrates seal assembly 30 when initially installed within a wall opening, in relaxed condition with its pressure bolts not yet tightened. FIG. 3 shows seal assembly 30 in compressed (sealed) condition after its pressure bolts have been tightened to complete the seal.

Modular seal assembly 30 is utilized in sealing a wall opening 32 having a boundary (interior) wall 34 of radius R (FIGS. 2 and 3) around a conduit 58. Conduit 58 may be the conduit for a telecommunication cable or an electrical cable; it may be a small water line or gas line. Seal assembly 30 includes an outer compression/expansion annulus (ring) 36 formed by a plurality of interleaved, interconnected arcuate elastomer blocks 38 each having an axial length L1 when the elastomer blocks are relaxed (unstressed).

In seal assembly 30, and in most embodiments of the invention, the inner and outer faces of the ring of elastomer blocks are each engaged by a plurality of inner pressure plates 40 and a corresponding plurality of outer pressure plates 42; there is an inner pressure plate 40 and an outer pressure plate 42 for each elastomer block 38. Each inner pressure plate 40 has a through aperture 44 in which there is an internally threaded metal insert 45. Alternatively, aperture 44 may have an integral internal thread. Similarly, the outer pressure plates 42 each have a through aperture 46, which may be provided with a cylindrical metal insert that has no internal thread. In seal assembly 30, as illustrated, the outer pressure plates 42 do not have metal inserts. Pressure plates 40 and 42 are rigid and relatively incompressible.

Pressure plates 40 and 42 may be made of metal or of rigid plastic; a preferred material for the pressure plates is glass fiber filled nylon (30% glass filling) and the pressure plates are typically made by injection molding. Each pressure plate is of arcuate configuration; see FIG. 1 and FIGS. 8 and 10. Each pressure plate has an arcuate length less than the arcuate length of one of the elastomer blocks 38. FIGS. 1-3 show ten arcuate elastomer blocks 38, ten inner pressure plates 40, and ten outer pressure plates 42. However, that number may be different for different sizes of wall opening 32. Because the elastomer blocks 38 are readily bendable, elastomer blocks of a given size can be adapted to wall openings of rather different radii R.

The modular seal assembly 30, FIGS. 1-3, further includes a plurality of pressure bolts 48, one associated with each elastomer block 38 and its pressure plates 40 and 42. Pressure bolts 48 are entirely conventional; socket head cap screws or other screws, preferably of Type 316 stainless steel, are acceptable. When seal 30 is assembled, each bolt 48 extends through the aperture 46 in one outer pressure plate 42, through an aperture 60 in the associated elastomer block 38 (or in two blocks 38) and is threaded into the insert 45 in the aperture 44 through one inner pressure plate 40; see FIG. 2.

Figure 12:
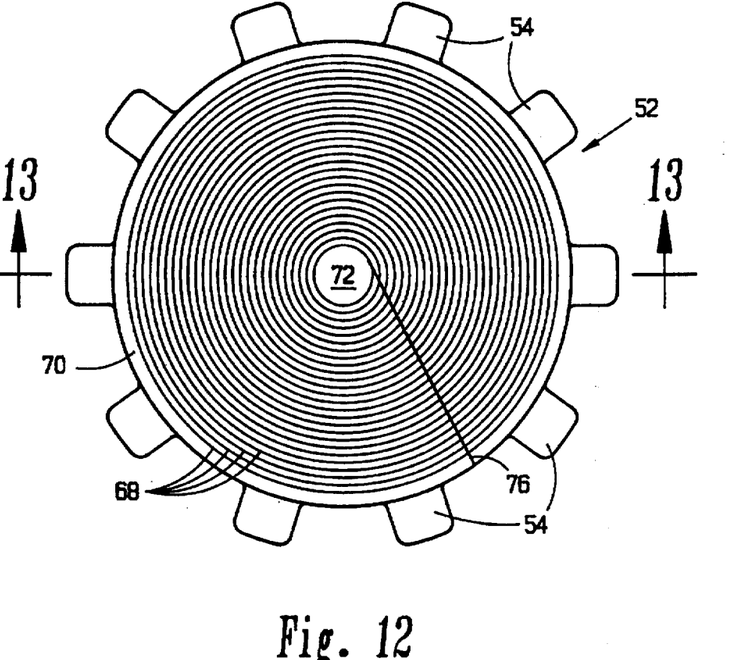
FIG. 12 is an elevation view of an inner elastomer disc for the modular seal assembly of FIGS. 1–3.
Figure 13:
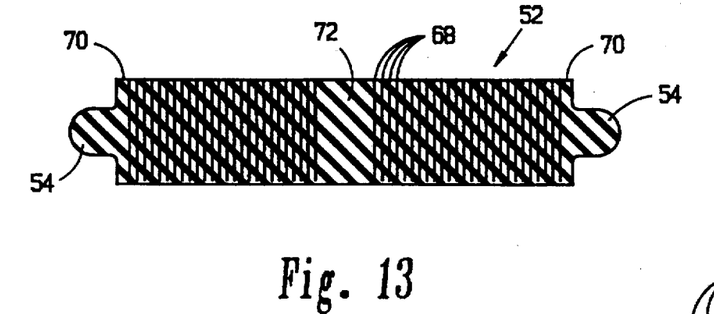
FIG. 13 is a detail sectional view taken approximately as indicated by line 13—13 in FIG. 12.
Figure 14:
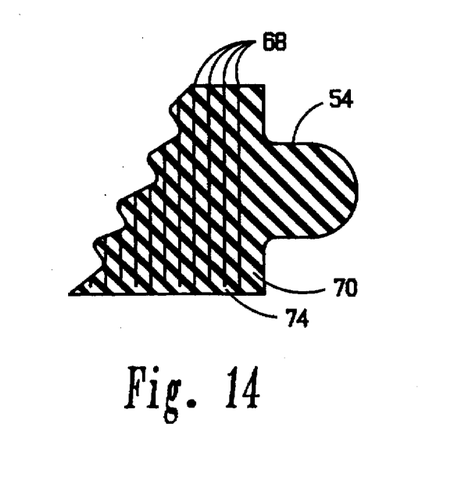
FIG. 14 is a detail sectional view, on an enlarged scale, of a segment of the sectional view of FIG. 13.

The modular seal assembly 30 also includes an inner elastomer disc 52 (FIGS. 1-3). Disc 52, described more fully hereinafter in connection with FIGS. 12-14, is quite thick; it has an unstressed axial length L2 (FIG. 2) that preferably is about seventy percent of the relaxed axial length L1 of the outer elastomer blocks 38. A conduit 58 for a cable, etc. extends axially through a central opening in disc 52; the central opening in the disc can be enlarged, as explained hereinafter, to accommodate a substantial range of conduit sizes. The outer radius of disc 52 should be no larger than the inner radius R2 of annulus 36 of elastomer blocks 38 to allow disposition of the disc within the central opening of the outer annulus. Disc 52 has a plurality of outwardly projecting lugs 54 that engage in sockets 56 in elastomer blocks 38 to interlock the disc within the central opening of the outer annulus 36.

FIG. 2 shows modular seal assembly 30 mounted within wall opening 32 in encompassing relation to conduit 58 before bolts 48 are tightened to complete the seal. From this rather loosely assembled condition, bolts 48 are tightened to compress the elastomer blocks 36 of outer annulus 38 axially between pressure plates 40 and 42; as a consequence, the elastomer blocks expand radially to engage wall 34 in sealing relation and to compress disc 52 radially inwardly around conduit 58, sealing the disc to the conduit. Usually, bolts 48 are tightened until the axial lengths of the elastomer blocks 38 are about the same as the original axial length L2 of inner disc 52. That is, bolts 48 are tightened until pressure plates 40 and 42 are approximately aligned with the inner and outer faces of disc 52. This is the sealed condition for assembly 30, illustrated in FIG. 3. Fluid, whether liquid or gas, cannot flow through wall opening 32; the wall opening is completely sealed. Nevertheless, the cable conduit 58 passes through the seal. The length L of wall opening 32 (FIG. 2) is usually immaterial. When L is quite large, a second seal assembly 30, axially displaced from that illustrated, may be warranted.

Figure 4:
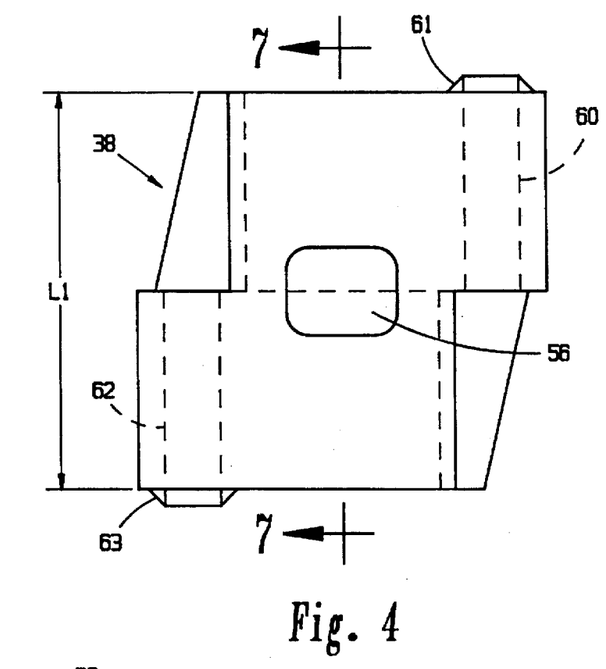
FIG. 4 is a detail plan view of an elastomer block for the seal assembly of FIGS. 1–3.
Figure 5:
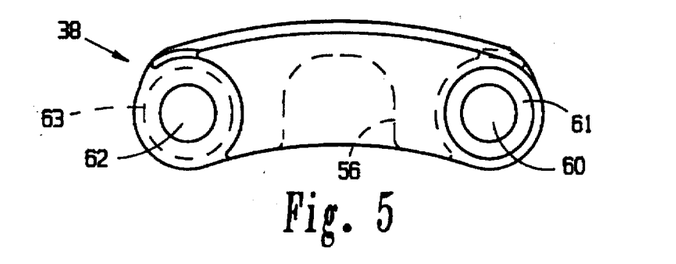
FIGS. 5 and 6 are detail elevation views of outer and inner ends, respectively, of the elastomer block of FIG. 4.
Figure 6:
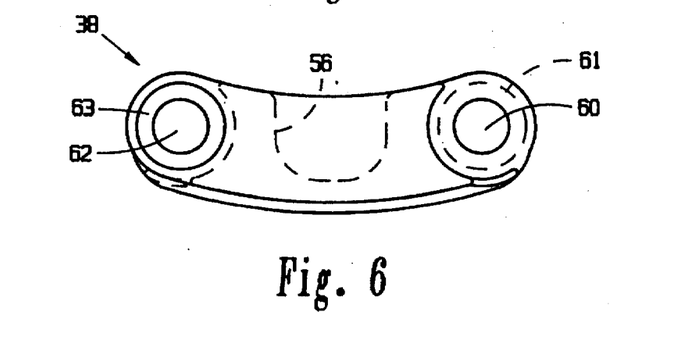
Figure 7:
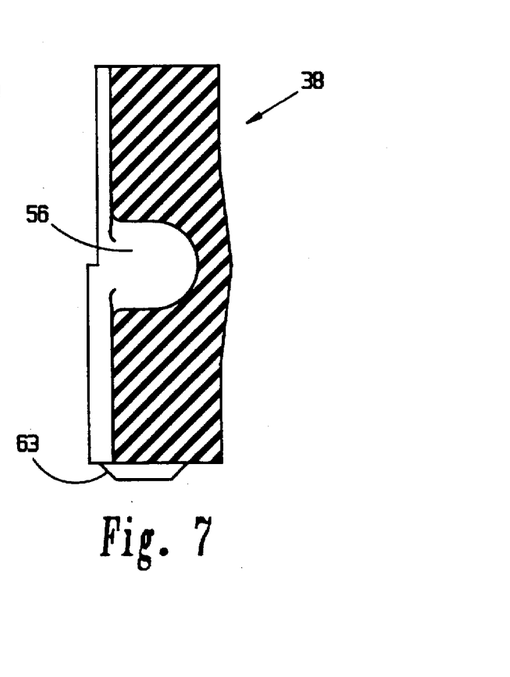
FIG. 7 is a sectional elevation view taken approximately along line 7—7 in FIG. 4.

FIG. 4-6 afford plan and end views of a preferred construction for the elastomer blocks 38 used to form the outer annulus 36 of the modular seal assembly 30 of FIGS. 1-3. FIG. 7 is a section of one elastomer block 38, taken approximately as indicated by line 7—7 in FIG. 5. Blocks 38 are made of an elastomer material; they may be formed of natural or synthetic rubber, EPDM, urethane, or virtually any other elastomer. Hot transfer molding is a preferred process for fabrication of elastomer blocks 38. Block 38, particular as shown in FIGS. 5 and 6, is arcuate in configuration, having an inner radius (R2, FIG. 2) of 39.2 mm, an outer radius of 50 mm (R3, FIG. 2), and a radial thickness of 10.8 mm (R1, FIG. 2). Each elastomer block 38 has an interlock socket 56 and two axial bolt-receiving apertures 60 and 62 at opposite ends of the block 9. Apertures 60 and 62 each extend half-way through the elastomer block and line up with the bolt-receiving apertures of adjacent elastomer blocks in the annulus 36, so that pressure bolts 48 aid in interconnecting the elastomer blocks. The outer ends of bolt-receiving apertures 60 and 62 are shown to have bosses 61 and 63, respectively; these bosses may be molded integrally into elastomer block 38. The axial length L1 of each block 38 may be thirty six mm.

Figure 8:
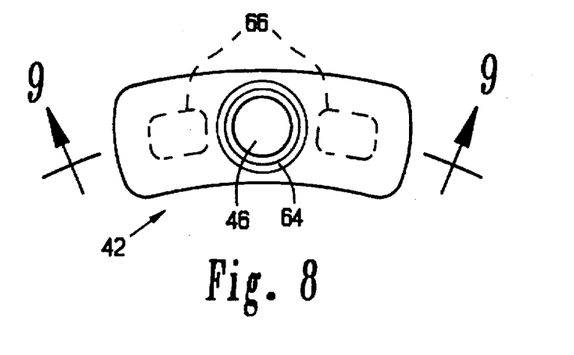
FIG. 8 is a detail elevation view of an outer pressure plate for the modular seal assembly of FIGS. 1–3.
Figure 9:
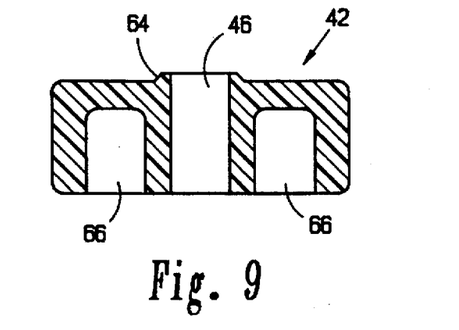
FIG. 9 is a detail sectional view taken approximately as indicated by arcuate line 9—9 in FIG. 8.

FIG. 8 provides a front face or elevation view of one of the outer pressure plates 42. A sectional view of pressure plate 42 is presented in FIG. 9, taken approximately along arc 9—9 in FIG. 8. There is one through aperture 46 to receive a pressure bolt 48; see FIG. 1. The outer surface of pressure plate 42 around the bolt-receiving aperture 46 has an integral boss 64.

Figure 10:
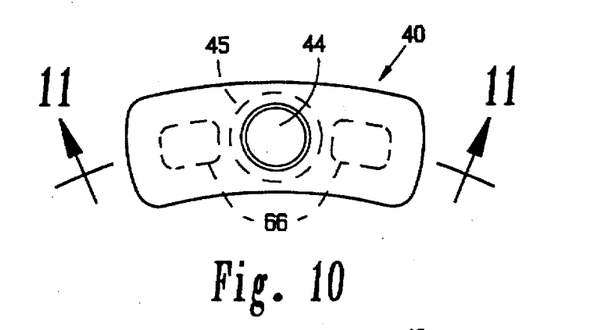
FIG. 10 is a detail elevation view of an inner pressure plate for the modular seal assembly of FIGS. 1–3.
Figure 11:
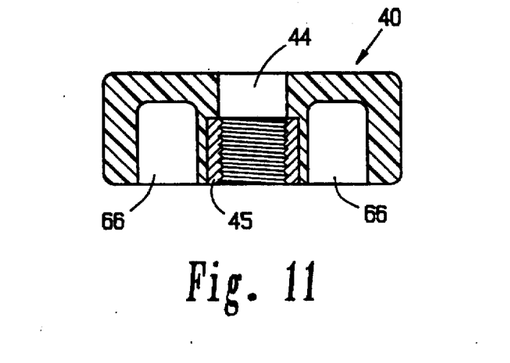
FIG. 11 is a detail sectional view taken approximately as indicated by arcuate line 11—11 in FIG. 10.

FIG. 10 affords a view, like FIG. 8, of one of the inner pressure plates 40, and FIG. 11 presents a section view taken approximately along arc 11—11 in FIG. 10. In pressure plate 40 there is one pressure bolt-receiving through aperture 44; a tubular metal insert 45 having an internal thread is mounted in the outer end of aperture 44. Insert 45 may be formed of any desired metal; stainless steel is preferred. Pressure plates 40 and 42 may have recesses 66 to reduce the amount of material in each. As previously noted, the preferred material for the pressure plates 40 and 42 is nylon filled 30% with glass fibers; injection molding may be employed.

FIGS. 12-14 illustrate the thick disc 52 for the center of the modular seal assembly. The central portion of disc 52 is cut to afford a multiplicity of annular, concentric layers 68; in disc 52, as illustrated in FIGS. 12 and 13, there are twenty five concentric layers 68 within a rim 70. A plurality of lugs 54 project radially outwardly from rim 70. A central plug 72 is formed integrally with disc 52; plug 72 is located within the innermost annular layer 68. A typical radial thickness for layers 68 is 1.27 mm, with a tolerance of ±0.3 mm. The cuts between layers 68 do not extend completely through disc 52; a continuous diaphragm 74 extends along one face of the disc, as best shown in FIG. 14. The thickness of diaphragm 74 is typically rather small; 0.6 mm is acceptable. There is a through cut 76 (FIG. 12) to make it possible to mount disc 52 on a conduit; the elastomeric nature of disc 52 makes this possible.

To provide a passage for a conduit through disc 52, the central plug 72 may be removed. If the conduit is larger than the plug, one or more of the concentric layers 68 can be readily removed, around the center of the disc, to enlarge the central opening for the conduit. Lugs 54 fit into sockets 56 in the outer elastomer ring (see FIG. 2) to maintain disc 52 in the central opening of the outer annulus of the seal assembly. When disc 52 is compressed by tightening of its pressure bolts 48, disc 52 seats firmly on and forms a seal around conduit 58; see FIG. 3.

Figure 15:
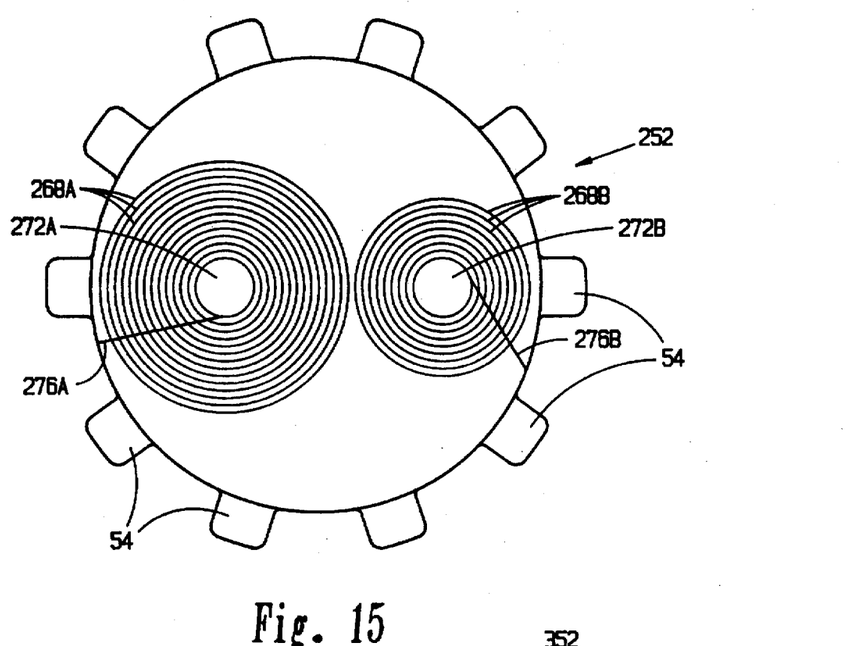
FIG. 15 and 16 are elevation views, like FIG. 12, showing different inner elastomer discs for two and three conduits, respectively.

FIG. 15 is an elevation view of a thick central disc 252 that is similar in most respects to disc 52 of FIGS. 12-14 but is modified to accommodate two conduits. Thus, in disc 252 there are two sets of thin, concentric layers 268A and 268B around two central plugs 272A and 272B, respectively. A through cut 276A allows disc 252 to be mounted on a conduit, once plug 272A (and possibly some of the layers 268A) has been removed. There is a similar through cut 276B in the part of disc 252 forming layers 268B. There may be different numbers of layers 268A and layers 268B; as shown in FIG. 15 there are thirteen layers 268A and eight layers 268B.

Figure 16:
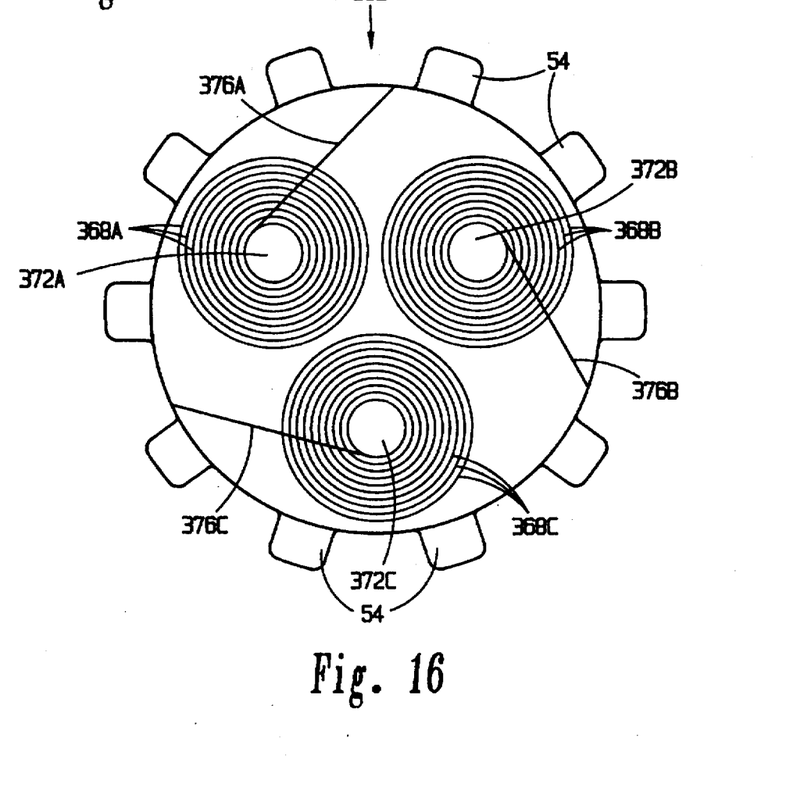

FIG. 16 is an elevation view, like FIG. 12, of another elastomer inner compression/expansion disc 352; disc 352 will accommodate three conduits through the seal. Thus, disc 352 has three sets of thin, concentric layers 368A, 368B, and 368C encompassing three central plugs 372A, 372B and 372C, respectively. In each set of concentric layers, nine layers are shown, and all of the sets of layers are the same size; they could be different. Like discs 52 and 252, disc 352 is formed of an elastomer such as natural or synthetic rubber, EPDM, or urethane; the concentric "onion skin" layers 368A, 368B and 368C are cut into the disc by a rotating cutting tool, using an air chuck fixture or other fixture to hold the disc stationary. A like technique is employed to form the concentric layers in discs 52 and 252. Disc 352 has three through cuts 376A, 376B and 376C to allow convenient mounting of the disc on three separate conduits.

Figures 17, 19, 20:
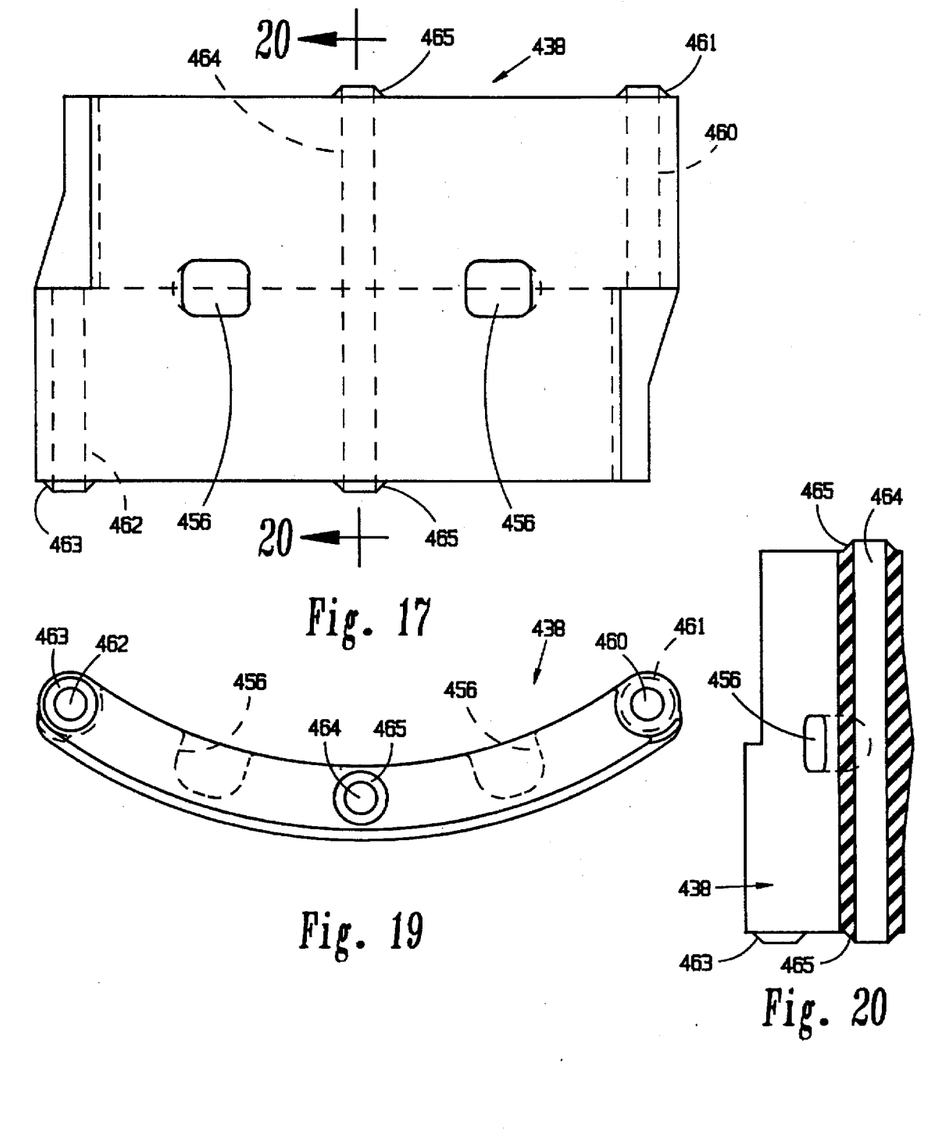
FIGS. 17 through 20 are views like FIGS. 4 through 7, respectively, of a different elastomer block usable in the invention.
Figure 18:
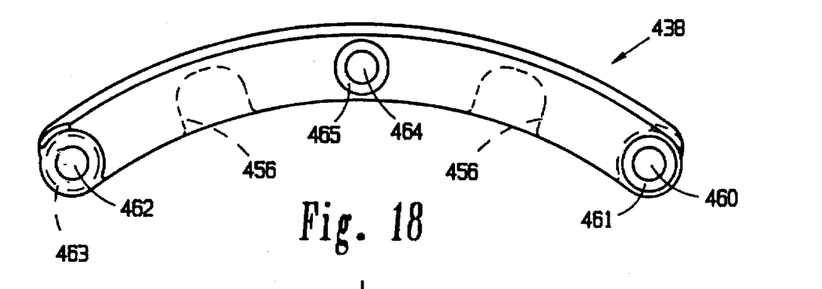

FIGS. 17-19 illustrate a modified elastomer block 438 for use in the modular seal assembly of the invention; FIG. 20 is a section view of the elastomer block 438 taken approximately as indicated by section line 20—20 in FIG. 17. The radial thickness of block 438 may be about seven millimeters. The arcuate length of elastomer block 438 is larger than that of the previously-described block 38; fewer elastomer blocks 438 are required for an annulus of given radius.

A principal difference between elastomer block 438 (FIGS. 17-20) and elastomer block 38 (FIGS. 4-7) is that block 438 has three through apertures 460, 462 and 464 for the pressure bolts, as compared to the two apertures 60 and 62 in block 38. Bolt receiving apertures 460 and 462 in block 438 are essentially the same as apertures 60 and 62 in block 38, and have end surface bosses 461 and 463. The third pressure bolt aperture 464 passes through the arcuate center of block 438 and has bosses 465 on the opposite surfaces of the elastomer block. Moreover, there are two lug-receiving interlock sockets 456 (FIGS. 17 and 18), since elastomer block 438 covers twice the arc of block 38. Of course, the previously described pressure hardware (e.g., FIGS. 8-11) should be modified to accommodate the revised elastomer blocks 438. The modular wall seal assembly of the invention applies a radial compression force to the inner elastomer disc upon tightening of the pressure bolts of the outer annulus. One outer annulus is suitable for a number of different combinations of conduits of varying size, so that proliferation of exterior pressure components of different sizes, one for each size of wall opening, is not required. A complete wall opening seal, with no conduit through the seal, is obtained simply by leaving the central plug(s) in place in the inner disc. Of course, different sizes of the seal assembly are still necessary to fit wall openings of widely different sizes, but the number of required assembly sizes is much smaller than before. In FIGS. 2 and 3 the wall opening 32 is shown as horizontal; it could equally well be vertical or at some angle to the horizontal.

We claim:

1. A modular seal assembly for sealing a wall opening having a boundary wall with a given axial length and a radius R, the modular seal assembly comprising:

an outer compression/expansion annulus including a plurality of interconnected elastomer blocks, each block having an outer face and an inner face displaced by an axial length L1 and each block having a given radial thickness, the elastomer blocks being interconnected in an outer annulus having a central opening of radius R2 and having an outer radial dimension adapted to be smaller than R to allow insertion of the outer annulus into the boundary wall of the opening;

a thick, elastomer inner compression/expansion disc, having an outer annular surface radius no larger than R2 to allow disposition of the disc in the central opening of the outer annulus and having an axial length L2 smaller than L1, disposed within the central opening of the outer annulus; and a plurality of pressure bolts, each associated with at least one said outer elastomer block, each pressure bolt extending axially through at least one said outer elastomer block, for applying pressure to the associated said outer elastomer block to compress that said outer elastomer block axially and to expand that said outer elastomer block radially outwardly against the boundary wall of the opening and radially inwardly against the inner elastomer disc.

2. A modular seal assembly, according to claim 1, and further comprising:

interlock means, independent of the pressure bolt, for interlocking the inner elastomer disc axially and rotationally within the central opening of the outer annulus.

3. A modular seal assembly, according to claim 2, in which the interlock means includes a plurality of lugs and sockets around the juncture of the outer annulus and the inner disc.

4. A modular seal assembly, according to claim 3, in which said plurality of interlock lugs are formed integrally with the inner disc and project radially outwardly from the inner disc and each lug is received in one of said sockets in one of said elastomer blocks.

5. A modular seal assembly, according to claim 1, in which the elastomer inner disc has an axial aperture through which a fixed non rotating conduit extends, whereby tightening of the pressure bolts seals the inner elastomer disc to the conduit, seals the outer annulus to the inner disc, and is adapted to seal the outer annulus to the boundary wall.

6. A modular seal assembly, according to claim 5, and further comprising:

interlock means, independent of the pressure bolts, for interlocking the inner elastomer disc axially and rotationally within the central opening of the outer annulus.

7. A modular seal assembly, according to claim 5, comprising a plurality of axial apertures in the elastomer inner compression/expansion disc for accommodating plural non-rotating conduits.

8. A modular seal assembly, according to claim 1, and further comprising:

a plurality of rigid inner pressure plates, each having a threaded aperture for receiving one of said pressure bolts, each inner pressure plate engaging the inner face of at least one one of said elastomer blocks.

9. A modular seal assembly, according to claim 1, and further comprising:

a plurality of rigid outer pressure plates, each having an aperture for receiving one of said pressure bolts, each outer pressure plate engaging the outer face of at least one of said elastomer blocks.

10. A modular seal assembly, according to claim 9, and further comprising:

a plurality of rigid inner pressure plates, each having a threaded aperture for receiving one of said pressure bolts, each inner pressure plate engaging the inner face of at least one of said elastomer blocks.

11. A modular seal assembly, according to claim 10, in which all said elastomer blocks and all said pressure plates are of arcuate configuration.

12. A modular seal assembly, according to claim 11, in which each inner pressure plate and each outer pressure plate has an arcuate length less than the arcuate length of one of said elastomer blocks.

13. A modular seal assembly, according claim 12, and further comprising:

interlock means, independent of the pressure bolts, for interlocking the inner elastomer disc axially and rotationally within the central opening of the outer annulus.

14. A modular seal assembly, according to claim 1, in which the inner disc is formed with a plurality of thin, annular, concentric axial layers that are able to be removed to accommodate different conduit sizes.

15. A modular seal assembly, according to claim 14, in which the inner disc has an axial through cut from the center of the concentric layers to the outer annular surface of the disc to permit mounting the disc in encompassing relation to a conduit.

16. A modular seal assembly, according to claim 15, and further comprising:

interlock means, independent of the pressure bolts, for interlocking the inner elastomer disc axially and rotationally within the central opening of the outer annulus.

* * * * *